United States Patent [19]
DeBellis et al.

[11] Patent Number: 6,104,810
[45] Date of Patent: *Aug. 15, 2000

[54] PSEUDORANDOM NUMBER GENERATOR WITH BACKUP AND RESTORATION CAPABILITY

[75] Inventors: Robert S. DeBellis, Raleigh, N.C.; Ronald M. Smith, Sr., Wappingers Falls; Phil Chi-Chung Yeh, Poughkeepsie, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,882

[22] Filed: May 15, 1997

[51] Int. Cl.$^7$ .............................. H04L 9/12; H04L 9/26; G06F 1/02; G06F 7/58
[52] U.S. Cl. .............................. 380/43; 380/44; 380/46; 708/250; 708/254
[58] Field of Search .................... 380/43, 44, 46; 364/717.01; 708/250, 254; 711/162

[56] References Cited

U.S. PATENT DOCUMENTS

| | | | |
|---|---|---|---|
| 4,905,176 | 2/1990 | Schulz | 364/717 |
| 5,416,783 | 5/1995 | Broseghini et al. | 371/22.3 |
| 5,506,905 | 4/1996 | Markowski et al. | 380/25 |
| 5,710,815 | 1/1998 | Ming et al. | 380/20 |
| 5,740,446 | 4/1998 | Fujiwara | 395/709 |
| 5,778,069 | 7/1998 | Thomlinson et al. | 380/25 |
| 5,857,025 | 1/1999 | Anderson et al. | 380/28 |

OTHER PUBLICATIONS

"Alpha–Particle Random Number Generator" by F. D. Austin et al., IBM Technical Disclosure Bulletin, vol. 30, No. 9, Feb. 1988, pp. 337–339.

"Integrated Circuit Compatible Random Number Generator" by R. A. Schulz, IBM Technical Disclosure Bulletin, vol. 30, No. 11, Apr. 1988, pp. 333–335.

"Fixed–Parity Pseudorandom Number Generator" by W. H. McAnney, IBM Technical Disclosure Bulletin, vol. 33, No. 3A, Aug. 1990, pp. 304–305.

"Software Pseudo–Random Number Generator Without Replacement" by R. R. Heisch, IBM Technical Disclosure Bulletin, vol. 35, No. 1B, Jun. 1992, pp. 159–160.

"Initialization Procedure for DEA–Based Pseudorandom Number Generator" by D. Abraham et al., IBM Technical Disclosure Bulletin, vol. 35, No. 1B, Jun. 1992, pp. 351–353.

"DEA–Based Pseudorandom Number Generator" by D. Abraham et al., IBM Technical Disclosure Bulletin, vol. 35, No. 1B, Jun. 1992, pp. 431–434.

*Primary Examiner*—Tod R. Swann
*Assistant Examiner*—Justin T. Darrow
*Attorney, Agent, or Firm*—William A. Kinnaman, Jr.

[57] ABSTRACT

Pseudorandom numbers are generated in a cryptographic module in a cryptographically strong manner by combining a time-dependent value with a secret value and passing the result through a one-way hash function to generate a hash value from which a random number is generated. The secret value is continually updated whenever the cryptographic module is idle by a first feedback function that generates an updated secret value as a one-way function of the current secret value and the time-dependent value. In addition, the secret value is updated on the occurrence of a predetermined external event by a second feedback function that generates an updated secret value as a one-way function of the current secret value, the time-dependent value and an externally supplied value. Upon power-on reset, if the pseudorandom number generator has not been previously initialized, it initializes itself by resetting the time-dependent and secret values and requiring the second feedback function to perform a predetermined number of updates of the secret value in response to external events. Otherwise, the time-dependent and secret values are restored using values stored in backup registers. A hash of the current secret value that is different from either feedback function is used as a backup secret value to minimize the possibility that restoration will result in repetition of pseudorandom numbers.

9 Claims, 5 Drawing Sheets

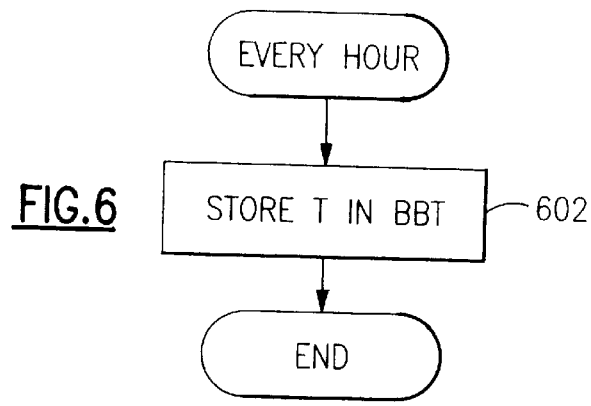
FIG.6
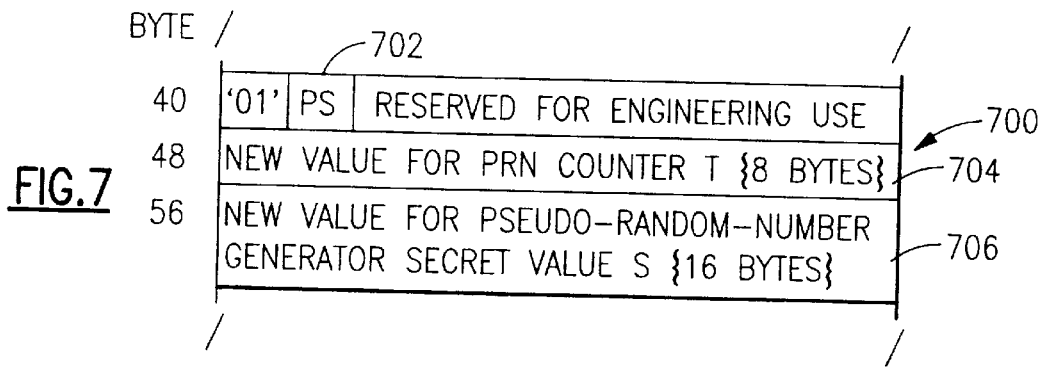
FIG.7
FIG.8
| PS | T | F1 | F2 |
|----|---|----|----|
| 0  | n | n  | n  |
| 1  | n | n  | q  |
| 2  | n | s  | n  |
| 4  | s | n  | n  |
| 8  | c | i  | q  |
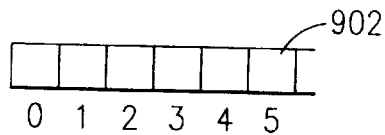
FIG.9

PSEUDORANDOM NUMBER GENERATOR WITH BACKUP AND RESTORATION CAPABILITY

CROSS-REFERENCE TO RELATED APPLICATIONS

This application is related to the following commonly owned, concurrently filed application of the same inventors, incorporated herein by reference:

"Pseudorandom Number Generator", Ser. No. 08/856,562;

"Pseudorandom Number Generator with Normal and Test Modes of Operation", Ser. No. 08856,828.

BACKGROUND OF THE INVENTION

1. Field of the Invention

This invention relates to a method and apparatus for generating pseudorandom numbers and, more particularly, to a method and apparatus for generating pseudorandom numbers in a cryptographic module of a computer system.

2. Description of the Related Art

In many large computer systems, cryptographic functions such as encryption and decryption, key management and the like are offloaded to a special-purpose cryptographic module or facility that is designed to provide an enhanced level of physical security. Applications invoke the cryptographic functions by issuing defined service requests to the cryptographic module.

One of the standard functions performed by a cryptographic module is random number generation, or more precisely pseudorandom number (PRN) generation since the numbers are usually generated by a deterministic process. Pseudorandom numbers may be generated either in the performance of some cryptographic function (such as key management) or in response to a request from an application (such as for an initializing vector) that is performing some cryptographic procedure.

Random number generators can be grouped into two types: true random and pseudorandom. True random number generators are based on some physical noise source of random information, such as alpha particles, output of a zener diode, power supply voltage variations, etc. The generator may use this random noise directly or may use it to control an oscillator. For example, U.S. Pat. No. 4,905,176 to R. A. Schulz, entitled "Random Number Generator Circuit", derives randomness from noise variations in the power supply voltage; these variations are used to control the frequency of a free-running oscillator.

True random number generators are exposed to circuit failures that are not easily detected. It is also difficult, if not impossible, to certify that a true random number generator is actually random and not predictable. This is particularly true for a very large scale integrated (VLSI) chip. It is difficult to guarantee that a free-running oscillator will actually result in a random, rather than a repeatable, pattern. As the manufacturing process gets more accurate, there is a tendency for all chips to operate in the same manner. Also, a VLSI chip may have a tendency to produce the same output each time it is powered up.

Pseudorandom number generators, on the other hand, operate deterministically but produce output values that satisfy various statistical tests of randomness. Pseudorandom number generators may take advantage of the characteristics of digital circuitry to perform error checking. Thus, a failure of the circuitry can easily be detected.

The overall security of a cryptographic module (and thus the system as a whole) is critically dependent on having a cryptographically strong pseudorandom number generation algorithm. By "cryptographically strong" is meant that not only must the values provided meet all the normal tests for statistical randomness, but also, given one or more outputs of the pseudorandom number generator, the work factor to determine previous values or predict future values must be computationally infeasible. Otherwise, an attacker might determine these previous or future values and use them to compromise the security of the system.

This problem of providing a cryptographically strong pseudorandom number generation algorithm has been compounded by recent improvements in integrated circuit technology, which has allowed functions previously performed on multiple interconnected chips to be performed on a single physical chip. As a result of this consolidation, initialization of the pseudorandom number generator becomes a more critical issue. No longer are several asynchronous units tied together. Instead, all the functions are in a single chip. With a single chip containing the entire function, it becomes much more likely that the resultant state after two different initialization sequences will be the same, or at least with some correlation. This is because timings between the various parts of the same chip will have much less variation between one initialization and the next than they did when these units were in different parts of the system with different power sources at different temperatures and with other environmental variations. Also, this consolidation onto a single chip may result in less variation between units. One would expect much less variation between different chips than between systems assembled from multiple units.

Thus, there is an exposure that an attacker can experiment with a particular chip, or with several chips, and be able to predict the approximate state of the pseudorandom number generator after the initialization sequence. This prediction, along with the fact that some of the outputs from the pseudorandom number generator are made publicly available, while others are used for critical secret information, presents a significant exposure to the security of the entire system.

It should be noted that the level of correlation or the accuracy of prediction does not have to be very high to present a problem. In the area of public key cryptography, the work factor required for public keys is measured in terms of MIPS (millions of instructions per second) years. If, as was the case on one previous machine, the state of the pseudorandom number generator is determined by the combination of two asynchronous events measured with a 10-nanosecond clock and the attacker knows the timing of these within a variation of 10 milliseconds, then the total number of states of the pseudorandom number generator is $10^{12}$. If the attacker can compute these at the rate of $10^6$ a second, he can find the state in about six days.

D. Abraham et al., "DEA-Based Pseudorandom Number Generator", *IBM Technical Disclosure Bulletin*, vol. 35, no. 1B, June 1992, pp. 431–434, and D. Abraham et al., "Initialization Procedure for DEA-Based Pseudorandom Number Generator", *IBM Technical Disclosure Bulletin*, vol. 35, no. 1B, June 1992, pp. 351–353, (hereinafter collectively referred to as "Abraham et al.") describe a pseudorandom number generator designed for use in a cryptographic system.

Abraham et al. generate a 64-bit pseudorandom number (RNDNK) by XORing the outputs of two triple-DES encryption functions operating with respective 128-bit encryption keys; these encryption keys (referred to as seed keys) are generated from a system master key in an initialization procedure. The first encryption function receives as a data input the output of a first counter (ctr) that is incremented each time a request is received for generating a pseudorandom number. The second encryption function receives a data input that depends on the mode of operation. In a first mode, the data input is the same counter output (ctr) used as the data input to the first encryption function. In a second mode, the data input is the output of a counter (ctr1) that is incremented by the system clock.

In their initialization procedure, Abraham et al. first generate a value Y independently of the system master key using a series of iterations, one for each entry of a master key part. On the first iteration, the contents of a 64-bit register reg1 are replaced with eK(reg1), where eKo denotes DES encryption under the key K=hex '55555555 55555555'. On each subsequent iteration before the final iteration, the register contents reg1 are replaced with eK(reg1 XOR ctr1), where ctr1 is the output of a 64-bit counter incremented by the system clock. On the final iteration, the XOR product is used as the output value Y rather than being stored in the register reg1, and the register reg1 is reset to zero. The Y value is used to generate 64-bit parts (k1left, k1right, k2left, k2right) of the two 128-bit seed keys (K1, K2) as k1left=eKM(Y)

k1right=eKM(Y+1)

k2left=eKM(Y+2)

K2right=eKM(Y+3)

where eKM() denotes encryption under the 128-bit system master key KM and+denotes ordinary addition.

Although Abraham et al. claim that their procedure is cryptographically strong, a closer inspection reveals several weaknesses.

Abraham et al. require update of the system master key to initialize the pseudorandom number generator. Initialization of the pseudorandom number generator is thus tied to initialization of the system master key. Therefore, Abraham et al. cannot generate pseudorandom numbers before installation of the first system master key and thus cannot generate the system master key internally (since the key generation process itself requires a random number). Often, however, random numbers are required before a system master key has been installed. Also, Abraham et al. cannot reinitialize the pseudorandom number without changing the system master key.

In addition to these initialization problems, Abraham et al. introduce no new entropy (i.e., randomness) into their pseudorandom number generator after initialization. (There is the entropy of the lack of an exact value of ctr1, but this entropy does not increase over time, so the effect is no new entropy.) In such a system, if an attack "succeeds" (that is, one pseudorandom number is broken), the work factor for all other pseudorandom numbers is essentially zero.

As noted above, the scrambling function used in Abraham et al. is triple DES. This has a weakness in that given a known value for the output and the seed, the input can be directly computed.

Abraham et al. claim that the work factor to cryptanalyze the seed keys is at least as great as that to cryptanalyze the system master key. However, this is not true, as the values used at the output are, as noted above, eKM(Y), eKM(Y+1), eKM(Y+2) and eKM(Y+3). Since Y is only 64 bits, an exhaustive attack requires only $2^{64}$ possible values for Y. This is a work factor of only $2^{64}$ whereas the work factor for the system master key KM is $2^{128}$.

In Abraham et al., for all initializations except perhaps for the first, reg1 and ctr1 are reset to zero. To see the problem this may create, assume that user A has permission to use the crypto facility. User A enters a known system master key in two parts. In this case, since there are no intermediate iterations, the value Y is not even a function of the 64-bit counter ctr1. If user A knows Y and the master key (KM), then K1 and K2 are easily computed. If the second method (using ctr1) is used to generate a random number, ctr can easily be computed given K1, K2, ctr1, and RNDNK. Thus, after determining ctr1, which may be a relatively low work factor, user A can determine the current value of ctr with a work factor of zero. When the crypto facility is turned over to user B, user A still has valuable information about the facility. When B changes the master key, A has approximate information about the value of ctr (which is not reset) and ctr1 (which is reset).

In the Abraham et al. system as described in the above-identified references, when only a two-part system master key is entered, the resulting seed key is completely deterministic with a work factor of zero. Thus, Abraham is subject to an insider trap door attack. This can easily be improved by changing it to use ctr1 in each iteration, however the work factor is still quite low. If we assume that a attacker can estimate the time within $2^{10}$ cycles, then the work factor to find the seed would be $2^{20}$.

Abraham et al. derive their seed keys from internal counter/clock values sampled "at indeterminate times based on independent external events not under the control of an adversary". However, it is not good enough merely to be "not under the control" of an adversary. For the system to be secure, the adversary must not have any information about the time. In general, the adversary will have some information (at least what year, probably what day). As shown above, the work factor here may be less than $2^{20}$.

What is needed, therefore, is a pseudorandom number generator that can be implemented on a single silicon chip, can be initialized with integrity, has a suitably high work factor, and has an algorithm simple enough, yet strong enough, that it can be published. This latter point is important since cryptographic systems are generally more secure when they rely on secret values in known algorithms rather than on the secrecy of the algorithm itself. Often the scrutiny that results from publication can uncover subtle weaknesses in an algorithm that are not immediately apparent.

Another problem with pseudorandom number generators relates to their restoration after power off. Thus, an integrated circuit (IC) chip may implement a pseudorandom number generator in active components which are volatile registers. If system power is removed, the active components are lost and the pseudorandom number generator must be reinitialized. This is undesirable, as initialization requires a considerable amount of time and external cooperation. There are several possible schemes for backing up the working registers to nonvolatile storage as part of normal operation; after a power failure, the working registers can be restored from the nonvolatile storage. However, it turns out that most of these schemes are highly susceptible to replay attacks.

Finally, in a system in which special hardware is used to implement a pseudorandom number generator, special problems are encountered in testing the circuitry that is unique to the pseudorandom number generation process. Many failures that would make the output unacceptable cannot be easily detected.

SUMMARY OF THE INVENTION

The present invention contemplates a backup and restoration system for the pseudorandom number generator described in copending application Ser. No. 08/856,562 (docket PO997046).

In accordance with the invention described in that application, pseudorandom numbers are generated in a cryptographic module in a cryptographically strong manner by concatenating a time-dependent value (generated by a real-time counter) with a secret value and passing the concatenation result through a one-way hash function to generate a hash value from which a random number is generated. Because of this strong one-way function, given the output and any portion of the input, the remaining portion of the input can be computed only by exhaustive search.

Entropy is continually added to the system so that breaking one pseudorandom number reveals only those pseudorandom numbers generated before entropy has been added. Thus, the current secret value is continually updated whenever the cryptographic module is idle by a first feedback function that generates a first updated secret value as a one-way function of the current secret value and the current time-dependent value. In addition, the current secret value is updated on the occurrence of a predetermined external event by a second feedback function that generates a second updated secret value as a one-way function of the current secret value, the current time-dependent value and an externally supplied value.

Upon power-on reset, if the pseudorandom number generator has not been previously initialized, it initializes itself by resetting the time-dependent and secret values to zero and resetting an initialization count to a predetermined positive value. The initialization count is decremented each time an external event causes the second feedback function to update the secret value; initialization is complete when the initialization count has been decremented to zero. If on power-on reset the pseudorandom number generator has been previously initialized, the current time-dependent and current secret values are restored using values stored in backup registers.

In accordance with the present invention, to provide integrity and secrecy and to avoid replay attacks, periodic backup of the hardware information to nonvolatile storage is coupled with additional appropriate feedback, update and restoration algorithms. Backup, rather than being direct, uses a hashing function that is different from the hashing function used for normal update. More particularly, while the current time-dependent value is used as backup time-dependent value, a hash of the current secret value that is different from either feedback function is used as a backup secret value. This minimizes the possibility that restoration will result in repetition of pseudorandom numbers.

More particularly, one aspect of the present invention contemplates a backup and restoration system for a cryptographic pseudorandom number generator in which a secret value is replaced with an updated secret value generated as a first function of the current secret value and a time-dependent value and a pseudorandom number is generated as a second function of the secret value and time-dependent value differing from the first function. In accordance with this aspect of the invention, rather than deriving a backup secret value directly from the current secret value, a backup secret value is generated as a third function of the secret value and time-dependent value differing from the first function.

Another aspect of the present invention contemplates a backup and restoration system for a cryptographic pseudorandom number generator in which a pseudorandom number is generated as a function of a secret value and a time-dependent value. In accordance with this aspect of the invention, at a predetermined time (as at power-on reset) the pseudorandom number generator determines whether the time-dependent value and the secret value have been previously initialized. If the time-dependent value and the secret value have not been previously initialized, then the pseudorandom number generator initializes these values. On the other hand, if the time-dependent value and the secret value have been previously initialized, the pseudorandom number generator restores these values from backup values rather than reinitializing them.

BRIEF DESCRIPTION OF THE DRAWINGS

FIG. 6 is a flowchart of the procedure for periodically backing up the time-dependent value.

FIG. 7 shows a portion of the request message for a Diagnose instruction.

FIG. 8 shows the stepping modes of the pseudorandom number generator shown in FIG. 2.

FIG. 9 shows the crypto configuration control (CCC) mode bit of the cryptographic module shown in FIG. 1.

DESCRIPTION OF THE PREFERRED EMBODIMENT

Cryptographic Module

Figure 1:
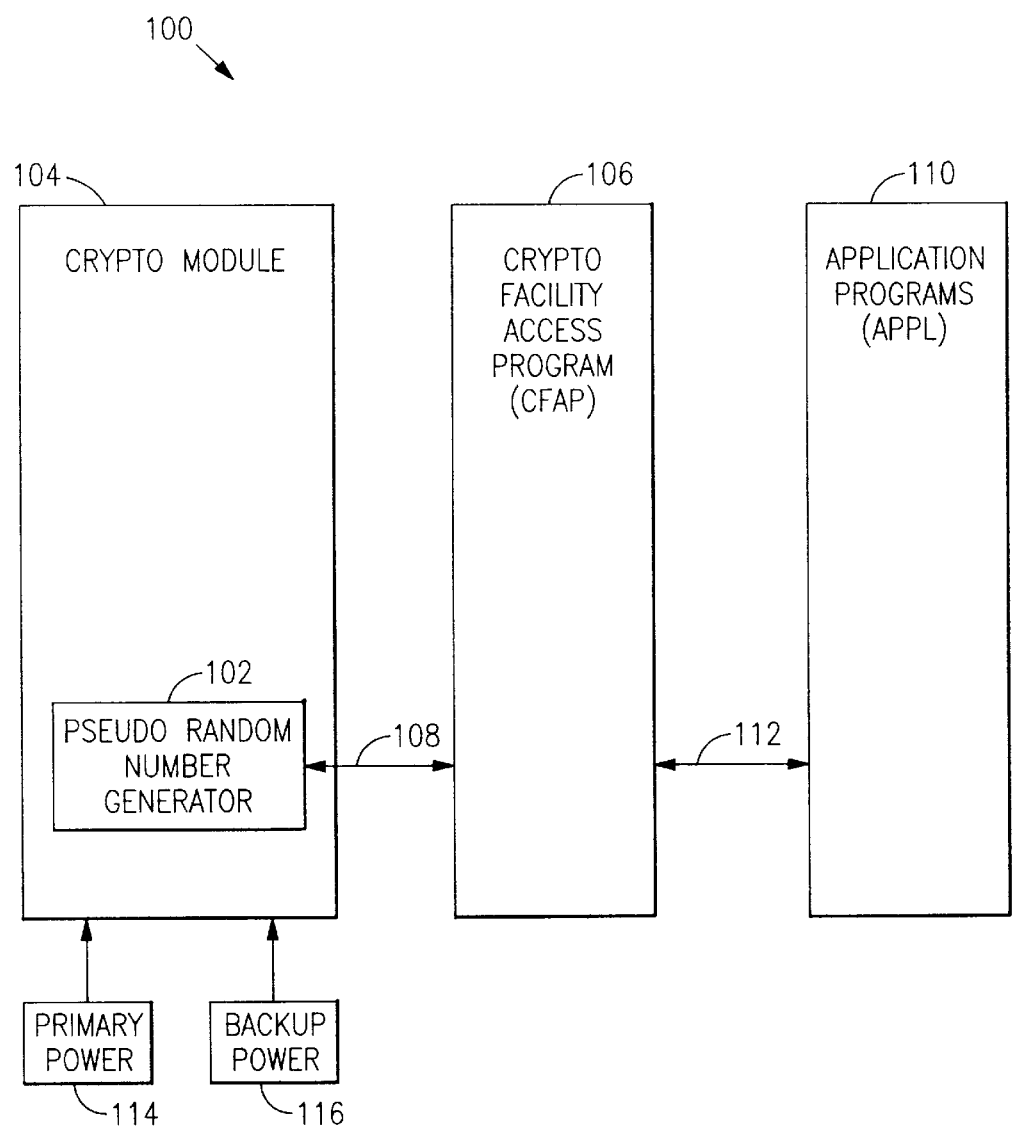
FIG. 1 is a schematic block diagram of a computer system incorporating the pseudorandom number generator of the present invention.

FIG. 1 shows a typical system environment in which the pseudorandom number generator of the present invention may be used. As shown in the figure, a computer system 100 includes the pseudorandom number generator (PRNG) 102 of the present invention as part of a cryptographic facility (CF) or cryptographic module 104. In addition to including generator 102, cryptographic module 104 may include other cryptographic functions (not shown) for encryption, key management, digital signature processing and the like. A cryptographic facility access program (CFAP) 106 accesses generator 102 via a hardware interface 108. An application program 110 wishing to perform a cryptographic function (in this case, pseudorandom number generation) makes a call via a programmming interface 112 to CFAP 106, which in turn invokes generator 102 via interface 108.

Pseudorandom Number Generator

Figure 2:
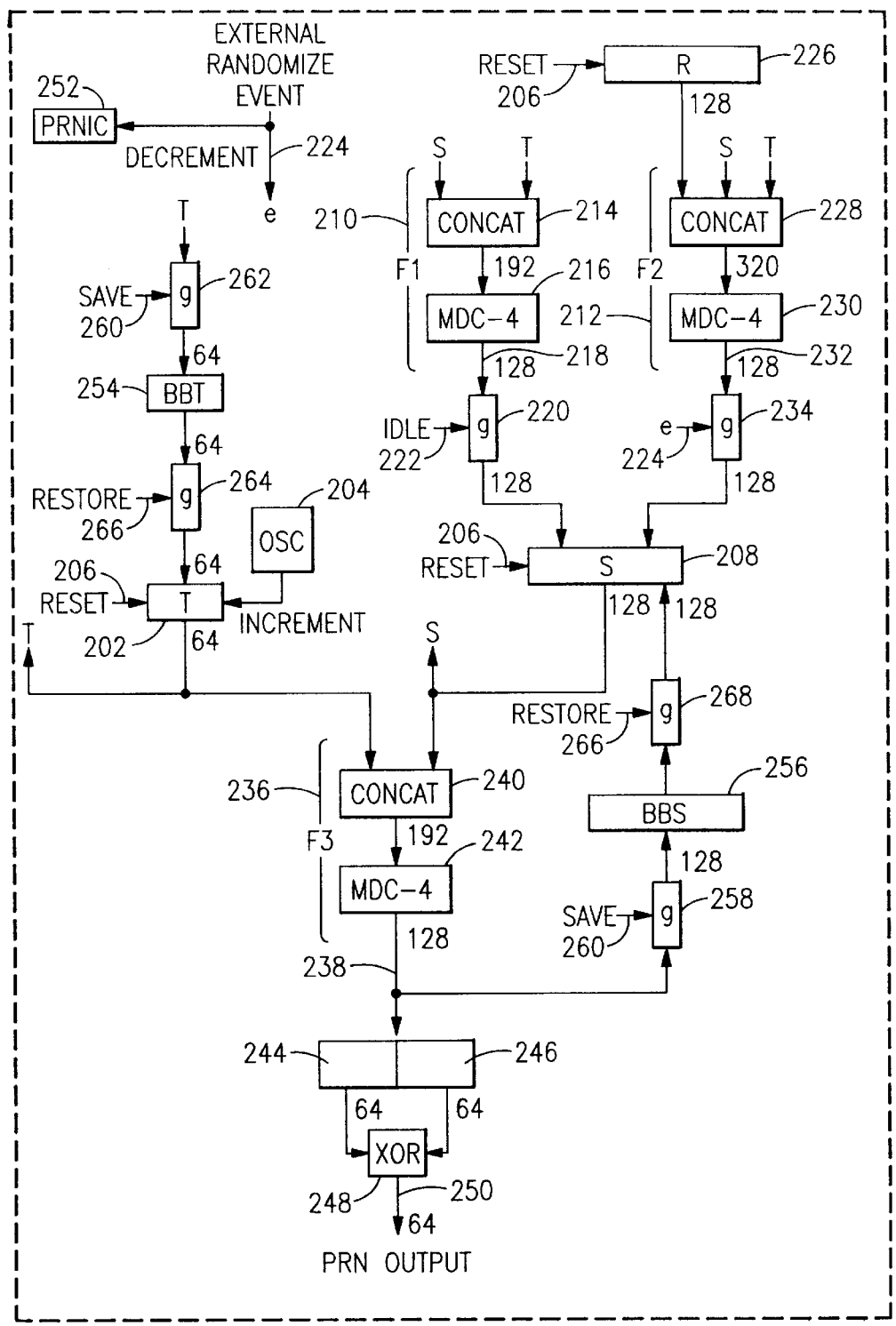
FIG. 2 is a schematic block diagram of the pseudorandom number generator of the system shown in FIG. 1.

FIG. 2 shows a preferred implementation of the pseudorandom number generator (PRNG) 102 shown in FIG. 1. Generator 102 preferably comprises a single integrated circuit chip as described in the background portion of the specification. However, generator 102 may be distributed across multiple chips if desired, and some or all of the functions may be implemented as software or microcode (i.e., a machine-readable program of instructions tangibly embodied on a program storage devices) rather than purely as hardware.

Generator 102 includes a 64-bit real-time counter 202 that is incremented continuously by an oscillator 204 to produce a count T. Count T is incremented at a sufficiently rapid rate (preferably the fastest rate possible for the machine 100) that an adversary will be unable to predict the exact value of T and hence will face an increased work factor. At the same time, counter 202 should have a sufficient number of bits that it never recycles through zero during the lifetime of the machine 100. T is set to zero by a crypto module reset signal 206, which resets the cryptographic module 104.

Generator 102 also includes a 128-bit register 208 for storing a randomization state S. S is set to zero by crypto module reset signal 206. After initialization is complete, S will contain secret information.

During normal operations, the randomization state S may be updated by either of two feedback functions F1 (210) and F2 (212).

Feedback function F1 continuously updates S whenever the cryptographic module 104 is idle (i.e., not performing other activities). More particularly, feedback function F1 concatenates (214) S and T in that order and passes the 192-bit concatenation result through a one-way hash function 216 (such as the MDC-4 function described below) to generate a 128-bit hash value 218. A gate (g) 220 controlled by an idle signal 222 that is active whenever cryptographic module 104 is idle passes the hash value 218 back to S register 208.

Feedback function F2, on the other hand, is invoked by an external input, specifically an external randomize event (e) as represented by a signal 224. External randomize event e may be the receipt of a command from an application 110 (FIG. 1), while a parameter in the command may be used as a randomization seed R stored in a register 226 (a 128-bit register in the embodiment shown). Other external events and parameters could be used instead; the important consideration is they are not readily ascertainable by an attacker. Feedback function F2 updates S using a one-way hash of R, S, and T. More particularly, feedback function F2 concatenates (228) R, S and T in that order and passes the 320-bit concatenation result through a one-way hash function 230 (such as MDC-4) to generate a 128-bit hash value 232. A gate (g) 234 controlled by the event signal 224 passes the hash value 232 back to S register 208.

A third function 236 (F3) produces a 128-bit value 238 as a one-way hash of T and S. More particularly, function F3 concatenates (240) T and S in that order and passes the 192-bit concatenation result through a one-way hash function 242 (such as MDC-4) to generate the 128-bit hash value 238. The left 64 bit (244) of this value are exclusive-ORed (248) with the right 64 bit (246) to produce an output comprising a 64-bit pseudorandom number (PRN) 250.

Before generator 102 is used it is initialized. A pseudorandom number initialization count (PRNIC) maintained by a counter 252 indicates the remaining number of external randomize events 224 required before the generator 102 is considered initialized. PRNIC counter 252 is set to a predetermined initial count (127 in the embodiment shown) at crypto module reset and, if nonzero, is decremented by one each time an external randomize event signal 224 occurs. Generator 102 is considered to be initialized only when the PRNIC counter 252 has been decremented to zero.

The randomization state S, which is 128 bit, gives generator 102 its basic cryptographic strength. The best known attack on generator 102 is to make the conservative assumption that the attacker knows T exactly, obtains several consecutive output values PRN (250), and performs an exhaustive attack to compute S. From this value S along with predicted future values for T, future random output values can be computed. The work factor for this attack is $2^{128}$. This work factor should then be increased by the number of low-order bits of T that cannot be known exactly by the attacker.

It should be noted that generation of an event signal 224 in response to an external command continues to cause the feedback function 212 (F2) to be performed, even after the initialization count is zero. This permits the caution user to add additional randomization to generator 102 (and thus "reseed" the generator) at any time.

Real-time counter 202 (T) provides three important functions. First, when more than 64 bit of pseudorandom numbers are required with no intervening idle period, the fact that T changes provides different output information for each execution of the generation function F3. The fact that T participates in the first stage of the three-stage MDC-4 in this case rather than the last, as described below, further reduces the risk that the output is susceptible to differential cryptanalysis.

Second, the use of counter 202 (T) ensures that the output of generator 102 does not have a short-term cycle of repetition. With current technology, the time for T to wrap around to zero may be several hundred years.

Third, counter 202 (T) is used as the basis for providing randomization as part of initialization. This is based on the assumption that although the value of T may be known approximately to the attacker, it cannot be known to the exact cycle. Thus, since signals 224 external to the cryptographic module 104 are used as stimulation to perform feedback function 212 (F2), in normal environments it will be impossible to predict or control these events to the exact cycle, and each of these stimulations adds additional randomness.

The requirement that a predetermined number of such stimulations (127 in the disclosed embodiment) be performed before generator 102 is initialized makes the work factor to break the generator by means of initialization in the same range as the basic strength.

Functions 210 (F1), 212 (F2), and 236 (F3) are all strong one-way hash functions such as MDC-4. The main difference between the functions is the order in which S (128 bit), T (64 bit), and the randomize information R (128 bit) are fed into the hash operation. The fact that these functions are strong one-way functions ensures that given an output value 250 from generator 102, it is computationally infeasible to compute previous or future output values.

Feedback function F1 increases the work factor to break generator 102. Since feedback function F1 may be performed using state-of-the-art encryption engines, an off-line attack based on computing starting at some known initial state may take as long to compute off line as it did to generate on line.

It is assumed that the state of the registers after power on is not random, but rather may be quite repeatable; therefore it is necessary to introduce randomness into generator 102 from an external event. Since randomness is introduced in this way, crypto module reset is defined to set all registers to a known state, thus permitting validation of error checking and correction codes in these registers.

As noted above, generator 102 does not become initialized until 127 repetitions of an external command have occurred; 127 is a larger retry number than would normally be used. If desired, rejection of an external command that cannot be handled because the generator 102 is being initialized can prompt a return of the initialization count (PRNIC) to the application 110 (FIG. 1). That way, the program 110 can be provided with information indicating the status of the initialization procedure.

Backup and Restoration

Cryptographic module 104 is powered by two power sources: a primary power source 114 and a battery backup power source 116 (FIG. 1). Most of the logic circuitry and active registers in cryptographic module 104 (such as those shown in FIG. 2) are designed for speed at the expense of additional power consumption and are powered only by the primary power source 114. When primary power is removed, information in these registers is lost. These registers are called volatile working registers.

Cryptographic module 104 also has storage powered by both the primary power source 114 and battery backup power source 116. This storage, which has lower power consumption and operates at lower speed, is called nonvolatile storage since the information is maintained when primary power is removed. It should noted however, that if both primary power and battery backup power are removed from the cryptographic module 104, information in the nonvolatile storage is lost.

Registers 202 (T) and 208 (S) are implemented in volatile working registers and thus the contents are lost when primary power is dropped to the cryptographic module 104. Associated with registers 202 (T) and 208 (S) are battery backup registers 254 (BBT) and 256 (BBS) for T and S. Registers 254 and 256 are implemented in nonvolatile storage (as defined above) so that once generator 102 has been initialized from external sources, it does not require external initialization during subsequent power-on sequences.

Figure 5:
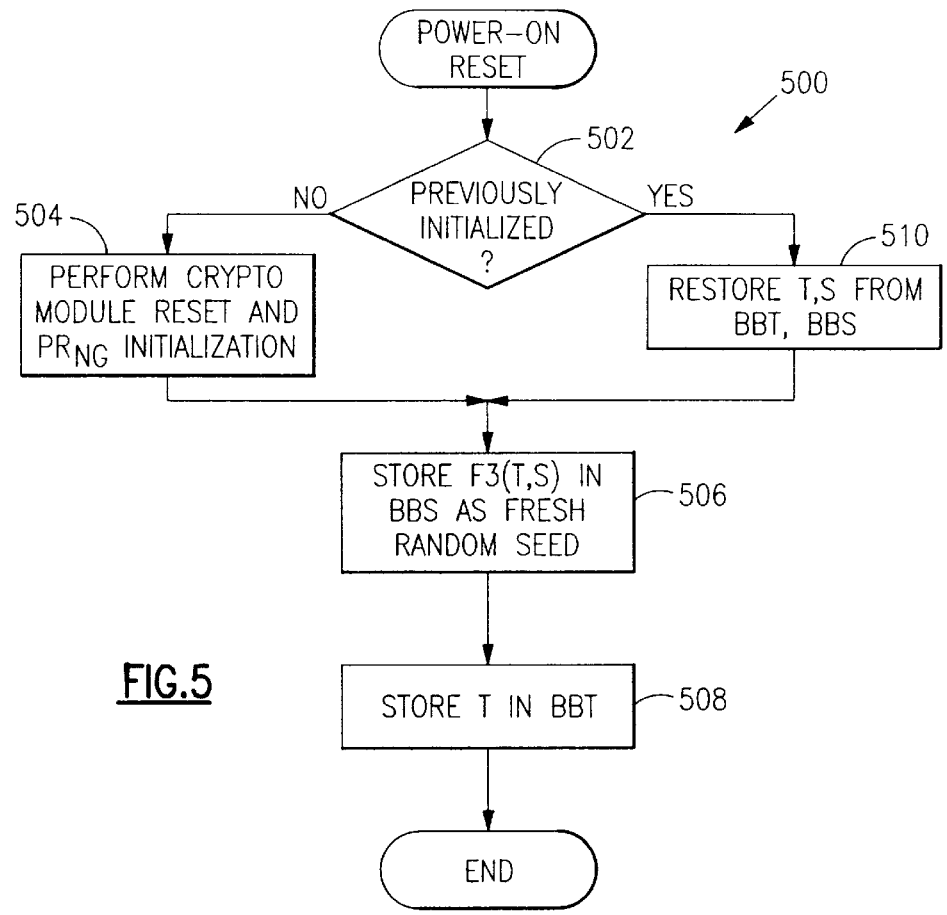
FIG. 5 is a flowchart of the effects of power-on reset.

FIG. 5 is a flowchart of the effects 500 of power-on reset. The action taken on power-on reset depends on whether the cryptographic module 104 has been previously initialized (step 502).

If the cryptographic module 104 has not been previously initialized, then power-on reset causes crypto module reset to be performed and places pseudorandom number generator 102 in the not initialized state (step 504). A pseudorandom number generator initialization process is performed before the pseudorandom number generator 102 can be used. As noted above, crypto module reset causes registers 202 (T) and 208 (S) to be set to zero and counter 252 (PRNIC) to be set to a predetermined positive count (e.g., 127). Pseudorandom number generator initialization is performed as follows: on each occurrence of an external event 224, PRNIC counter 252 is decremented by one and register 208 (S) is updated by feedback function F2. In addition, during the initialization period (as during other periods), register 202 (T) is periodically incremented by oscillator 204 and register 208 (S) is updated by feedback function F1 whenever the crypto module is idle. Pseudorandom number generator initialization is complete when the number of external randomize events 224 equal to the predetermined positive count have occurred and PRNIC has been decremented to zero.

Upon the completion of pseudorandom number generator initialization, the 128-bit output value 238 (=F3(T, S)) is placed in backup register 256 (BBS) via a gate (g) 258 controlled by a save signal 260 (step 506). Additionally, the current value of T is placed in backup register 254 (BBT) via a gate (g) 262 controlled by save signal 260 (step 508), completing the pseudorandom number generator initialization process.

If at step 502 the cryptographic module 104 has been previously initialized, then power-on reset causes registers 202 (T) and 208 (S) to be restored from the values in backup registers 254 (BBT) and 256 (BBS) (step 510). More particularly, register 202 (T) is restored from backup register 254 (BBT) via a gate (g) 264 controlled by a restore signal 266, while register 208 (S) is restored from backup register 256 (BBS) via a gate (g) 268 controlled by restore signal 266. Then, after several cycles, registers 254 (BBT) and 256 (BBS) are updated with the values T and F3(T, S), respectively, by means of a save signal 260 as described above (steps 506–508).

During normal operation, register 254 (BBT) may be updated with T periodically. Thus, as shown in FIG. 6, register 254 may be updated, say, every hour (step 602); the particular time interval used here is exemplary and is not critical. This action, while not required, keeps the value of BBT more or less current and avoids the possibility of restoring T to a very old value.

The procedure shown in FIGS. 5–6 may also be described in the form of pseudocode sequences in which=indicates replacement, ic indicates the initialization count PRNIC, and d indicates the timer increment. Thus, at power-on reset, if not previously initialized:

```
T = 0                                                    (504)
S = 0
for ic = 127 to 0, do
    S = F1(S, T)      (update during idle periods)
    T = T + d         (normal stepping of T)
    ...
    S = F1(S, T)      (update during idle periods)
    T = T + d         (normal stepping of T)
    ...
    S = F(R, S, T)    (update due to external event)
end
                      (initialization count is now zero)
BBS = F3(T, S)        (place a fresh random seed in BBS)  (506)
T = T + d             (normal stepping of T)
BBT = T               (place an updated value into BBT)   (508)
At power-on reset, if previously initialized:
T = BBT               (restore T)                         (510)
S = BBS               (restore S)
T = T + d             (normal stepping of T)
BBS = F3(T, S)        (place a fresh random seed in BBS)  (506)
T = T + d             (normal stepping of T)
BBT = T               (place an updated value into BBT)   (508)
Every hour:
BBT = T               (keep BBT more or less current)     (602)
```

The disclosed backup and restoration system may be favorably contrasted with various alternatives. Thus, as noted above in the background portion of the specification, one approach to the problem would be to dispense with backup registers and require that generator 102 be reinitialized each time power is restored. Reinitialization, however, is a computationally expensive operation. Therefore it is desirable that information be placed in nonvolatile storage so that once generator 102 has been initialized, it need not be reinitialized on subsequent power-on sequences.

The other approach mentioned in the background portion of the specification (and upon which the disclosed backup system is based) involves the use of nonvolatile backup registers (BBT and BBS) for volatile working registers T and S. However, updating of BBT and BBS from T and S is not so straightforward, as the logic clocks may stop and power can be lost without warning. Performance considerations make it impractical to continuously update BBT and BBS.

One possible scheme is to periodically update BBT and BBS, once per hour for example. However, this scheme has the problem that when power is restored, T and S are restored to a value previously used, and this has a high probability of generating the same pseudorandom numbers as were previously generated.

Another possible scheme is to periodically update either BBT or the left or right half of BBS from the corresponding working register. Since BBT and BBS are not updated atomically, the value restored during power-on reset would not be one that was previously used. This scheme also has a problem. If several power losses or resets occur in less than an hour, the starting value after each is the same, thus creating a high probability of repeating the same sequence of pseudorandom numbers. Still other schemes are possible, but suffer from the same exposure to repetition.

The action taken as a result of the power-on reset to update BBT and BBS after restoring T and S is designed to eliminate the possibility of another power-on reset starting with the same values, or with values related by a low work factor. To accomplish this, the value placed in BBS should be a strong one-way function (in this case, function F3) that should be different from the feedback functions F1 and F2 used to update S in the normal process. If this were not the case, then restoration of S from BBS would be exposed to causing repetition.

MDC-4 Algorithm

Figure 3:
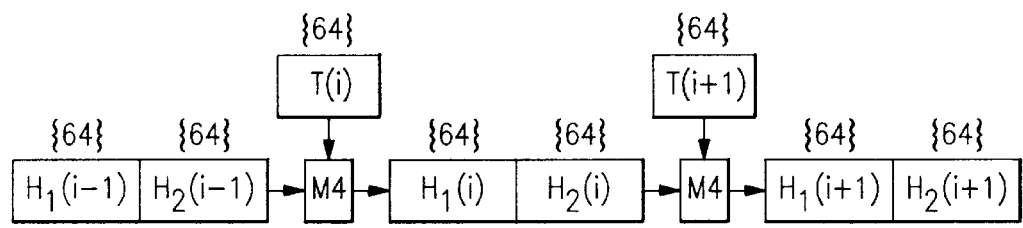
FIG. 3 is a schematic block diagram of the one-way function used in the pseudorandom number generator shown in FIG. 2.

The MDC-4 algorithm used in the disclosed system is well known in the art, but is described below for read reference. Referring to FIG. 3, processing in the MDC-4 algorithm consists of an iteration of steps called stages. At each stage, information from the previous stage (called the chaining value) is combined with information from the input (called the text) and a new chaining value is produced. For MDC-4, the chaining value (H) is 128 bit and the size of the input text (T) processed in each stage is 64 bits. The 128-bit chaining value, H, is treated as two 64-bit values, $H_1$ and $H_2$.

The chaining information into the first stage (stage 1) is defined as part of the procedure and is called the initialization value. Since the chaining information output from stage i is referred to here as H(i), the initialization value is referred to as H(0). The initialization value H(0) is defined as:

$$H(0)=H_1(0)|H_2(0)$$

where "|" denotes concatenation and:

$$H_1(0)=\text{'52525252 52525252'hex}$$

$$H_2(0)=\text{'25252525 25252525'hex}$$

After all the input text T(i) has been processed, there may be additional stages to add padding. Provided that the input text is constrained to be multiples of eight bytes, no padding is required.

After the last stage, including stages for padding, if any, the chaining value output from the last stage is used as the output hash value.

One-way functions 216, 230 and 242 are implemented in a straightforward manner in accordance with this general scheme. Thus, one-way function 216 in feedback function 210 (F1) is implemented as three stages (192 bits) in which the 128-bit value S provides the text inputs T(1)–T(2), the 64-bit value T provides the text input T(3), and the chaining value H(3) provides the output hash value 218. Similarly, one-way function 230 in feedback function 212 (F2) is implemented as five stages (320 bits) in which the 128-bit value R provides the text inputs T(1)–T(2), S provides the text inputs T(3)–T(4), T provides the text input T(5), and the chaining value H(5) provides the output hash value 232. Finally, one-way function 242 in function 236 (F3) is implemented as three stages (192 bits) in which T provides the text input T(1), S provides the text inputs T(2)–T(3), and the chaining value H(3) provides the output hash value 238.

FIG. 3 shows two stages of the MDC-4 algorithm. In stage i, a 128-bit input chaining value H(i–1), comprising 64-bit left and right halves $H_{1(i-1)}$ and $H_{2(i-1)}$, is inputted to a function M4 together with a text value T(i) to produce a 128-bit output chaining value H(i) comprising 64-bit left and right halves $H_1(i)$ and $H_2(i)$. Similarly, in stage i+1, chaining value H(i) is supplied as an input chaining value to a function M4 (identical to the function for the previous stage) together with a text value T(i+1) to produce a 128-bit input chaining value H(i+1) comprising 64-bit left and right halves $H_1(i+1)$ and $H_{2(i+1)}$.

Figure 4:
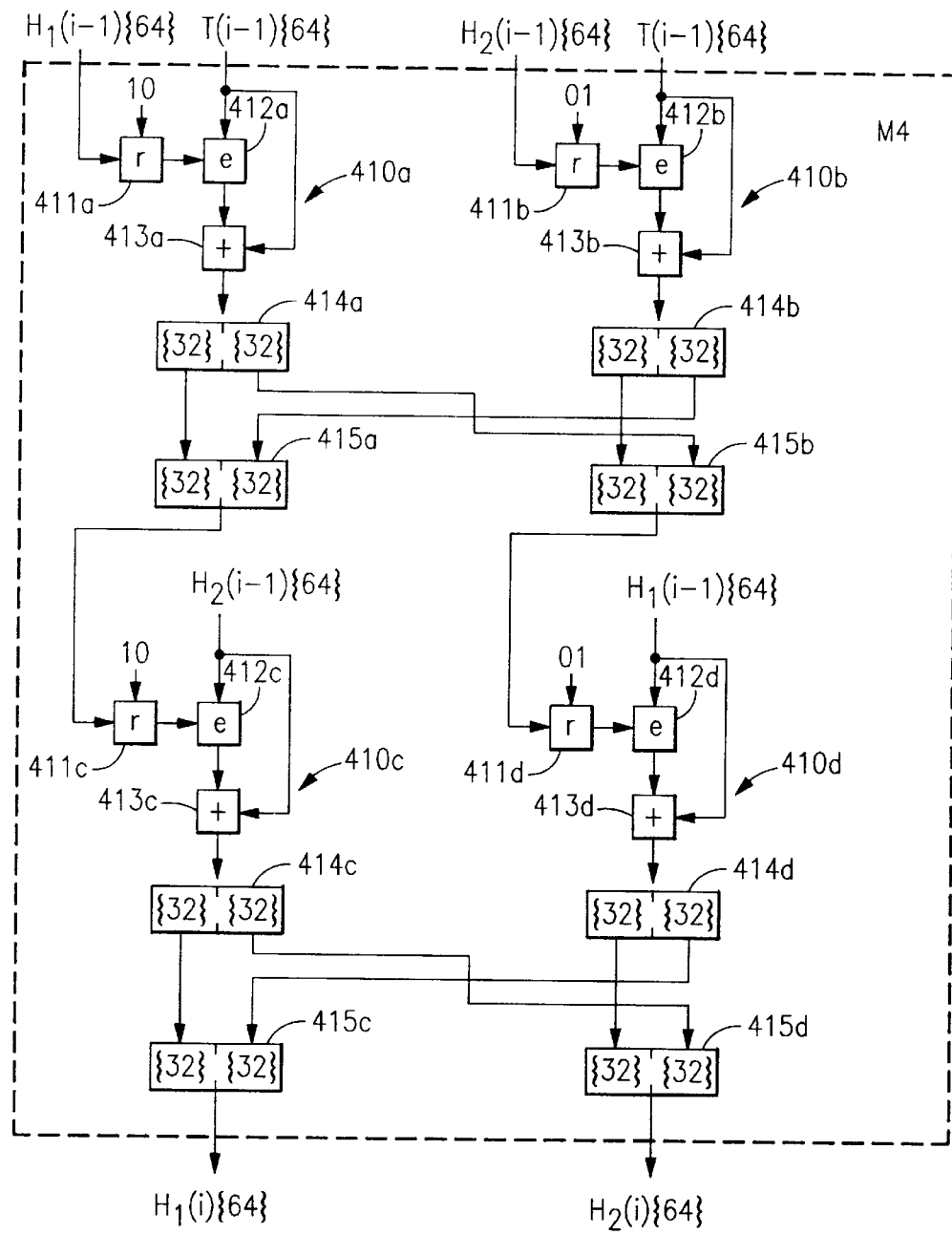
FIG. 4 is a schematic block diagram of a single stage of the one-way function shown in FIG. 3.

Referring to FIG. 4, function M4 of MDC-4 stage i comprises four sections 410a–410d, each of which comprises a 2-bit replacement function (r) 411a–411d, a DEA encryption function (e) 412a–412d, a 64-bit exclusive-OR (XOR) function (+) 413a–413d and a 32-bit swap function to be described.

In section 410a, replacement function 411a replaces two bits of 64-bit input value $H_1(i-1)$ with two replacement bits 10, as indicated in FIG. 4, to provide a key for encryption function 412a. Encryption function 412a uses this key to encrypt a 64-bit plaintext value T(i), using the Data Encryption Algorithm (DEA), also referred to as the Data Encryption Standard (DES) and well known in the art, to generate a 64-bit ciphertext value. XOR function 413a XORs the plaintext input value and the ciphertext output value from encryption function 412a to generate a corresponding XOR value 414a.

Similarly, in section 410b, replacement function 411a replaces two bits of a 64-bit input value $H_2(i-1)$ with two replacement bits 01, as indicated in FIG. 4, to provide a key for encryption function 412b. Encryption function 412b uses this key to encrypt a 64-bit plaintext value T(i), using the Data Encryption Algorithm (DEA), to generate a 64-bit ciphertext value. XOR function 413b XORs the plaintext input value and the ciphertext output value from encryption function 412b to generate a corresponding XOR value 414b.

The rightmost (low-order) 32-bit halves of XOR values 414a and 414b are swapped to provide respective 64-bit values 415a and 415b from sections 410a and 410b.

In section 410c, replacement function 411c replaces two bits of 64-bit value 415a with two replacement bits 10, as indicated in FIG. 4, to provide a key for encryption function 412c. Encryption function 412c uses this key to encrypt a 64-bit plaintext value $H_2(i-1)$, using the Data Encryption Algorithm (DEA), to generate a 64-bit ciphertext value. XOR function 413c XORs the plaintext input value and the ciphertext output value from encryption function 412c to generate a corresponding XOR value 414c.

Similarly, in section 410d, replacement function 411d replaces two bits of 64-bit value 415b with two replacement bits 01, as indicated in FIG. 4, to provide a key for encryption function 412d. Encryption function 412d uses this key to encrypt a 64-bit plaintext value $H_1(i-1)$, using the Data Encryption Algorithm (DEA), to generate a 64-bit ciphertext value. XOR function 413d XORs the plaintext input value and the ciphertext output value from encryption function 412d to generate a corresponding XOR value 414d.

Finally, the rightmost (low-order) 32-bit halves of XOR values 414c and 414c are swapped to provide respective 64-bit values $H_1(i)$ and $H_2(i)$ from sections 410a and 410b.

Testing

Some of the circuitry in FIG. 2 can be easily tested. Thus, in a typical implementation, PRNIC may be returned to the application program 110, permitting register 252 and its decrementing to be tested, while MDC-4 functions 216, 230, 242 may be implemented in hardware shared by other functions that can be used to test it. Of particular interest for testing purposes are register 208 (S), real-time counter 202

(T), and the data paths connecting these registers to the rest of the system. These, along with the state-machine logic to control feedback functions 210 (F1) and 212 (F2) and generation function 236 (F3), are unique to generator 102.

FIG. 7 shows the relevant portion of a request message 700 specifying parameters for a special test-mode command referred to herein as Diagnose. Preferably, Diagnose is a signed command that can be issued only by an authorized entity having a private signature key. Diagnose provides for the loading of special test modes that make the output of generator 102 deterministic (because the normal stepping operations have been inhibited), but use the same registers, one-way functions, and data paths as the normal mode. These test modes include a single-step mode and a no-stepping mode for both the real-time counter 202 (T) and the idle-feedback function 210 (F1). As noted above, these modes not only provide for deterministic testing of generator 102, but can be used to provide deterministic testing of other functions in the crypto module 104 that use the output of generator 102 as input.

Preferably, the Diagnose command is subject to a crypto configuration control (CCC) mode bit 902 (FIG. 9) that is set to zero to define a crypto module normal mode and to one to define a crypto module test mode. The Diagnose command is enabled only if the mode bit 902 is set to one, so that it cannot be issued when the crypto module 104 is being used by an ordinary user. Thus, a user is assured that the special test modes cannot be activated during normal operation.

A one-byte value 702 (ps) in byte 41 of the request message 700 is used to set the generator stepping mode, an eight-byte value 704 in bytes 48–55 of the request message is placed in the 64-bit real-time counter 202 (T), and a 16-byte value 706 in bytes 48–55 of the request message is loaded into the 128-bit secret value register 208 (S).

The stepping modes of generator 102 in the crypto module test mode are shown in FIG. 8, in which the letters in the F1 and F2 columns mean the following:

| | |
|---|---|
| c | The stepping function is continuous. |
| i | The feedback function is performed during idle periods. |
| n | The feedback (or stepping) function is not performed. |
| q | The feedback function is performed once each time an external event signal 224 is received. |
| s | The feedback (or stepping) function is performed once each time after a pseudorandom number 250 is generated for a crypto module function. |

Note that a ps value of 8 causes generator 102 to operate in the same manner as when in the crypto module normal mode.

Crypto module reset sets S, T, and ps to zero. Thus, if mode bit 902 is initially set to one, the registers of generator 102 all contain zeros and are not updated in the absence of a Diagnose command (since a ps of zero places the generator in a no-stepping mode). On the other hand, if mode bit 902 is initially set to zero, then all stepping and feedback functions of generator 102 are operational (since the ps value is ignored in the normal mode).

The crypto module test mode (as set by mode bit 902) and the associated Diagnose command permit all functions of generator 102 to be tested while the generator operates in a deterministic mode. Operation of generator 102 in the deterministic modes also provides for much easier and thorough testing of other crypto module functions that use pseudorandom numbers.

The handling of S, T, and ps is the same for any reset, including the special reset issued by the microcode during the handling of errors. But the effect of the reset action on these registers depends on mode bit 902. In crypto module normal mode (bit 902 is zero), S and T are restored from battery backup copies in nonvolatile storage (step 510) and the value in ps is ignored. In crypto module test mode (bit 902 is one), S, T and ps are all set to zero.

Conclusion

While a particular embodiment has been shown and described, various modifications will be apparent to those skilled in the art.

What is claimed is:

1. A method for pseudorandomly generating numbers capable of use in a cryptographic system, comprising:

storing a current secret value in a volatile working register powered by a primary power source;

storing a backup secret value in a nonvolatile register;

on power-on reset, replacing said current secret value with said backup secret value and then replacing said backup secret value with a value generated as a first function of said current secret value and other information;

replacing said current secret value with a value generated as a second function of said current secret value and other information, said second function differing from said first function; and generating a pseudorandom number as a third function of said current secret value and other information.

2. The method of claim 1 in which said other information comprises a time-dependent value.

3. The method of claim 1 in which said second function differs from said first function and said third function.

4. The method of claim 1 in which said first function, said second function, and said third function are one-way functions.

5. A program storage device readable by a machine, tangibly embodying a program of instructions executable by the machine to perform the method steps of claim 1.

6. A pseudorandom number generator capable of use in a cryptographic system, comprising:

means for storing a current secret value in a volatile working register powered by a primary power source;

means for storing a backup secret value in a nonvolatile register;

means operative on power-on reset for replacing said current secret value with said backup secret value and then replacing said backup secret value with a value generated as a first function of said current secret value and other information;

means for replacing said current secret value with a value generated as a second function of said current secret value and other information, said second function differing from said first function; and means for generating a pseudorandom number as a third function of said current secret value and other information.

7. The pseudorandom number generator of claim 6 in which said other information comprises a time-dependent value.

8. The pseudorandom number generator of claim 6 in which said second function differs from said first function and said third function.

9. The pseudorandom number generator of claim 6 in which said first function, said second function, and said third function are one-way functions.

* * * * *